March 3, 1942.    J. W. HOBBS    2,274,832
FLEXIBLE COUPLING
Filed April 28, 1939

Inventor
JOHN W. HOBBS.

Patented Mar. 3, 1942

2,274,832

UNITED STATES PATENT OFFICE 2,274,832

FLEXIBLE COUPLING

John W. Hobbs, Springfield, Ill., assignor to John W. Hobbs Corporation, Springfield, Ill., a corporation of Delaware Application April 28, 1939, Serial No. 270,523

3 Claims. (Cl. 64—27)

The present invention relates in general to flexible couplings, and more particularly to a flexible driving means which is particularly suited for use on electric vehicle clocks and other apparatus requiring a similar type of driving mechanism.

It is an object of the present invention to provide in a flexible connection or coupling between driving and driven parts of any mechanism for cushioning relative movement of the parts and decreasing noise.

A further object of the present invention is to provide a flexible coupling between a ratchet wheel and a shaft to be rotated therewith.

Figure 1:
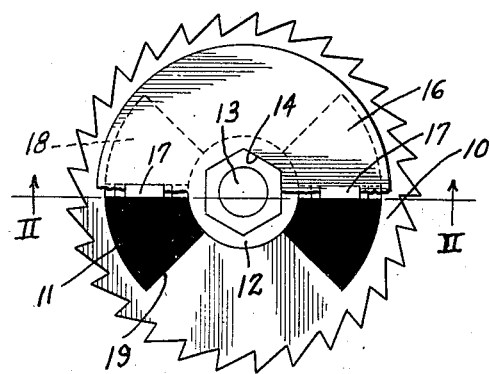
Figure 2:
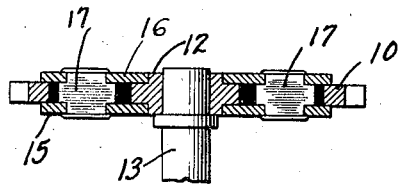

Other objects and features of the invention will more fully appear from the description, taken in connection with the accompanying drawing, which illustrates a single embodiment thereof, and in which:

Figure 1 is a plan view of a ratchet wheel construction, showing details of its connection with a driven shaft, portions being cut away to more clearly disclose the flexible coupling for cushioning the driving forces; and, Figure 2 is a sectional view of the same, taken substantially on the line II—II of Figure 1.

As shown on the drawing:

Heretofore, it has been the usual practice to directly connect a ratchet wheel with the driven shaft. As shown in Figures 1 and 2, a ratchet wheel 10 is provided with diametrically disposed segmental openings 11, and the ratchet wheel 10 is rotatably mounted on a sleeve 12 which surrounds a shaft 13 and is secured thereto for rotation therewith. The ends of the sleeve 12 are pressed into polygonal openings 14 formed at the centers of spaced disk members 15 and 16. These disks are rotatable with the shaft 13 and support the ratchet wheel 10 with its plane at right angles to the shaft. The ratchet wheel may be rotated relative to the disks 15 and 16, but is limited in this movement by bridging members 17, which extend through the openings 11 and laterally bear against rubber pads 18 and 19 forming resilient inserts in the openings so as to resiliently cushion relative movement between the ratchet wheel 10 and the disks 15 and 16 and decrease the noises during operation.

From the foregoing description, it will be apparent that the herein described invention provides an improved flexible connection or coupling between driving and driven parts of the mechanism for cushioning relative movement of the parts and decreasing noise. Such a type of construction is particularly useful where the ratchet wheel is employed in the rewind mechanism (not shown) of a clock mechanism.

It is, of course, to be understood that although I have described in detail one embodiment of my invention, the invention is not to be thus limited but only in so far as defined by the scope and spirit of the appended claims.

I claim as my invention:

1. Flexible driving means comprising a hub member, a pair of disc members each centrally apertured to axially receive an end of said hub, said apertures and hub ends being conformed to retain the discs and hub interlocked for unitary rotational movement, an annular disc member disposed between said pair of discs and supported for rotation on the hub, said annular disc having an opening therein between its inner and outer edges, a member extending through said opening for connecting said pair of discs and retaining them against axial disengagement from the hub ends, said member having an intermediate flat portion extending in a direction radially of the hub, and resilient bushing means in said opening engaged by opposite surfaces of said flat portion, whereby relative movements between the annular disc and the hub will be cushioned.

2. Flexible driving means comprising a hub member, a pair of disc members respectively connectable with the hub ends by axial movement thereof and when so connected being retained for concerted rotational movement with the hub, an intermediate disc member supported for rotational movement relative to the assembled pair of discs and the hub, said intermediate disc having a segmental opening therein, an edgewise disposed plate member in said opening interconnecting said pair of disc members and generally extending in a radial direction from the hub, and resilient insert means substantially filling said opening and engaging opposite surfaces of the plate member, whereby relative movements between the discs will be cushioned.

3. Flexible driving means comprising a hub member, a pair of disc members respectively connectable with the hub ends by axial movement thereof and when so connected being retained for concerted rotational movement with the hub, an intermediate disc member supported for rotational movement relative to the assembled pair of discs and the hub, said intermediate disc having an opening therein, a member interconnecting said plates having a flat portion within said opening presenting opposed substantial plane surface areas in a circumferential direction of the intermediate disc, and resilient insert means on opposite sides of said connecting member bearing against said surface areas for cushioning relative movements between it and the intermediate disc.

JOHN W. HOBBS.